United States Patent
Menezo et al.

(10) Patent No.: US 10,705,354 B2
(45) Date of Patent: Jul. 7, 2020

(54) METHOD OF FABRICATING A MODULATOR OF THE PROPAGATION LOSSES AND OF THE INDEX OF PROPAGATION OF AN OPTICAL SIGNAL

(71) Applicant: COMMISSARIAT A L'ENERGIE ATOMIQUE ET AUX ENERGIES ALTERNATIVES, Paris (FR)

(72) Inventors: Sylvie Menezo, Voiron (FR); Olivier Girard, Saint Egreve (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/319,902

(22) PCT Filed: Jul. 27, 2017

(86) PCT No.: PCT/FR2017/052100
§ 371 (c)(1),
(2) Date: Jan. 23, 2019

(87) PCT Pub. No.: WO2018/029414
PCT Pub. Date: Feb. 15, 2018

(65) Prior Publication Data
US 2019/0243167 A1    Aug. 8, 2019

(30) Foreign Application Priority Data
Aug. 8, 2016    (FR) ...................... 16 57626

(51) Int. Cl.
*G02F 1/025* (2006.01)
*G02F 1/225* (2006.01)
*G02F 1/21* (2006.01)

(52) U.S. Cl.
CPC ............ *G02F 1/025* (2013.01); *G02F 1/2257* (2013.01); *G02F 2001/212* (2013.01)

(58) Field of Classification Search
CPC .... G02F 1/025; G02F 2001/212; G02F 1/225; G02F 1/2257
See application file for complete search history.

(56) References Cited

U.S. PATENT DOCUMENTS 6,778,751 B2 * 8/2004 Tada .................. G02F 1/025
                                           385/131
7,482,184 B2    1/2009 Fedeli et al.
(Continued)

FOREIGN PATENT DOCUMENTS

FR          2 867 898 A1    9/2005
WO    WO 2005/091057 A1    9/2005
(Continued)

OTHER PUBLICATIONS

International Search Report dated Oct. 24, 2017, in PCT/FR2017/052100 filed on Jul. 27, 2017.

*Primary Examiner* — John Bedtelyon
(74) *Attorney, Agent, or Firm* — Oblon, McClelland, Maier & Neustadt, L.L.P.

(57) ABSTRACT

A method of fabricating a modulator of propagation losses and of index of propagation of an optical signal, including: following bonding of a substrate onto an encapsulated semiconductor layer including a first electrode of the modulator and prior to forming a second electrode of the modulator, the method includes: removing a base substrate onto which the encapsulated semiconductor layer is deposited to expose a face of a buried layer of dielectric material, situated under the buried semiconductor layer, without modifying thickness of the buried layer by more than 5 nm; and forming the second electrode is implemented directly on this exposed face of the buried layer such that, once the second (Continued)

electrode has been formed, it is the buried layer which directly forms a dielectric layer interposed between proximal ends of the electrodes of the modulator.

14 Claims, 4 Drawing Sheets

(56) References Cited

U.S. PATENT DOCUMENTS

| | | |
|---|---|---|
| 8,363,986 B2 | 1/2013 | Webster et al. |
| 8,761,220 B2 | 6/2014 | Ben Bakir et al. |
| 2005/0208694 A1 | 9/2005 | Yue et al. |
| 2011/0073989 A1 | 3/2011 | Rong et al. |
| 2012/0189317 A1 | 7/2012 | Heck et al. |
| 2013/0301975 A1 | 11/2013 | Spann et al. |
| 2014/0376857 A1 | 12/2014 | Chantre et al. |
| 2015/0055910 A1 | 2/2015 | Liang |
| 2016/0047986 A1 | 2/2016 | Chantre et al. |
| 2017/0082877 A1 | 3/2017 | Arimoto et al. |

FOREIGN PATENT DOCUMENTS

| | | |
|---|---|---|
| WO | WO 2011/037686 A1 | 3/2011 |
| WO | WO 2013/155378 A1 | 10/2013 |
| WO | WO 2015/194002 A1 | 12/2015 |

* cited by examiner

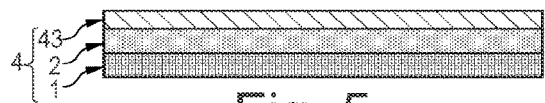
Fig. 5
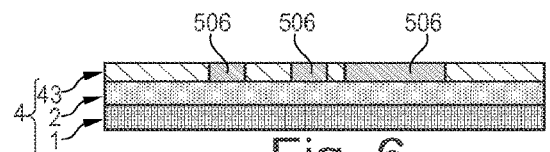
Fig. 6
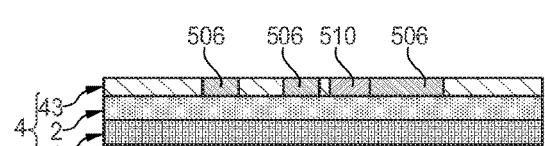
Fig. 7
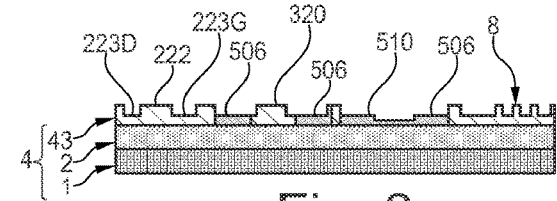
Fig. 8
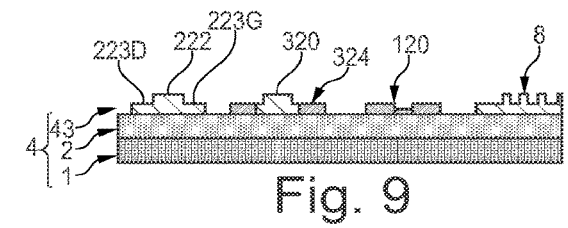
Fig. 9
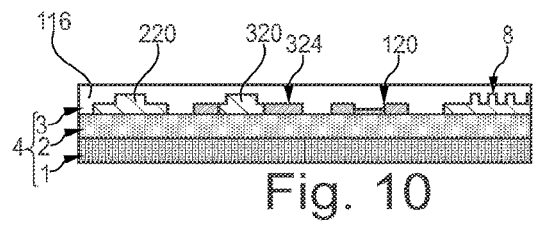
Fig. 10
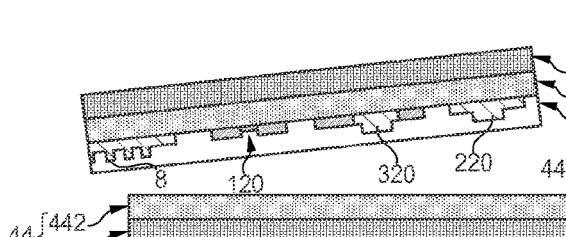
Fig. 11
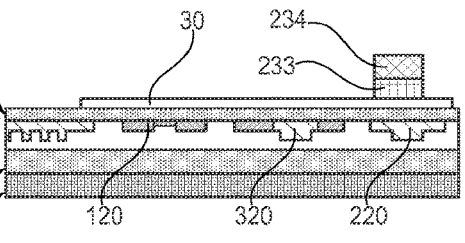
Fig. 12
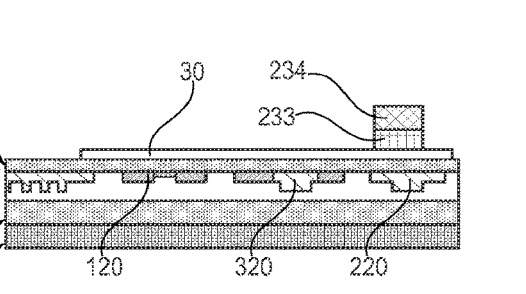
Fig. 13
Fig. 14

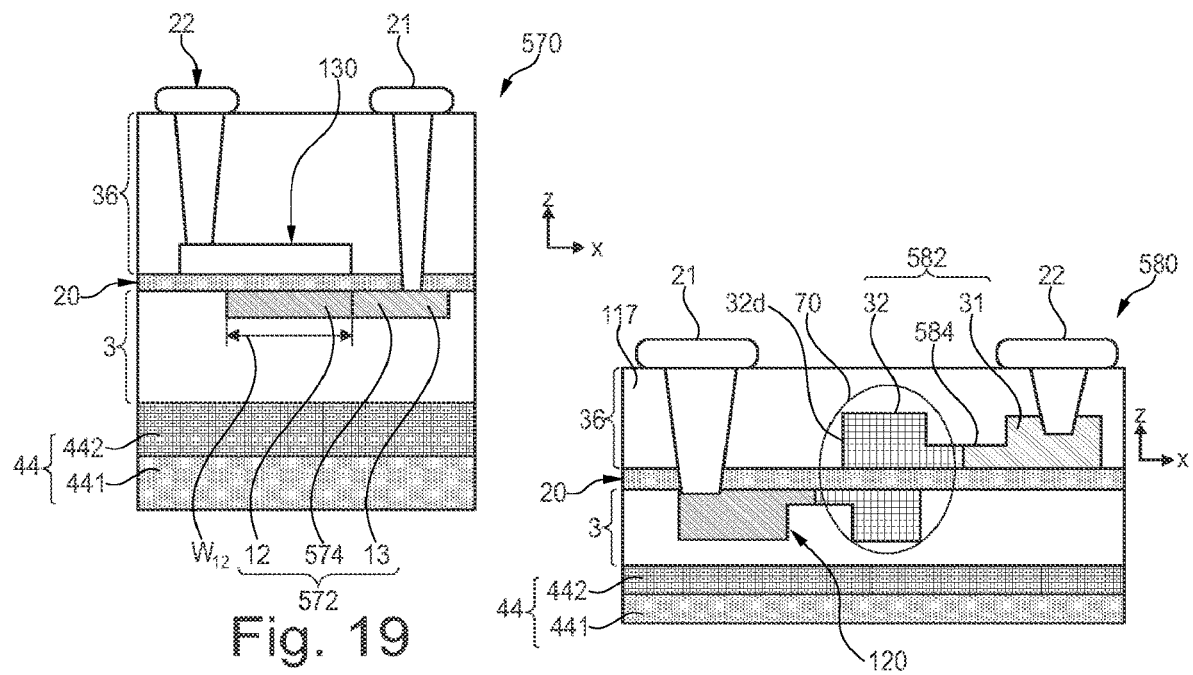
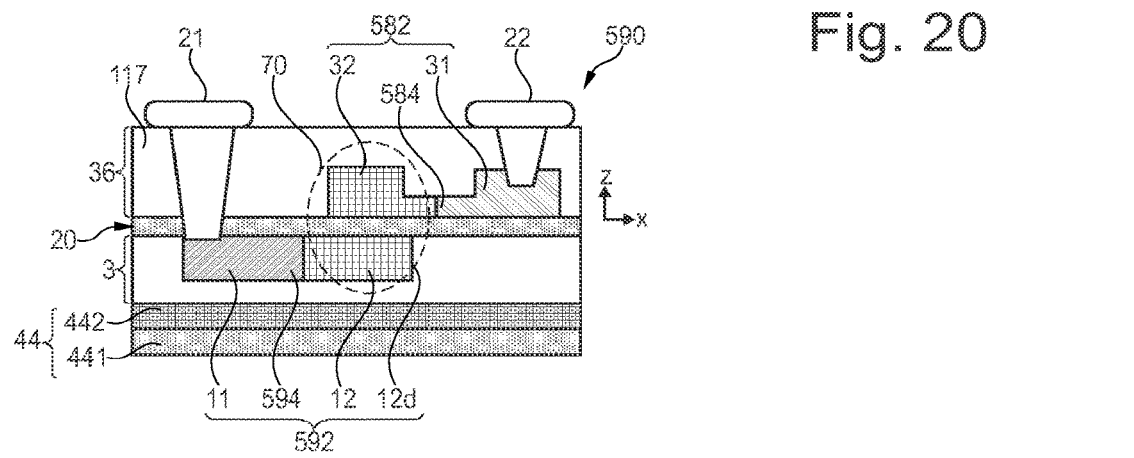
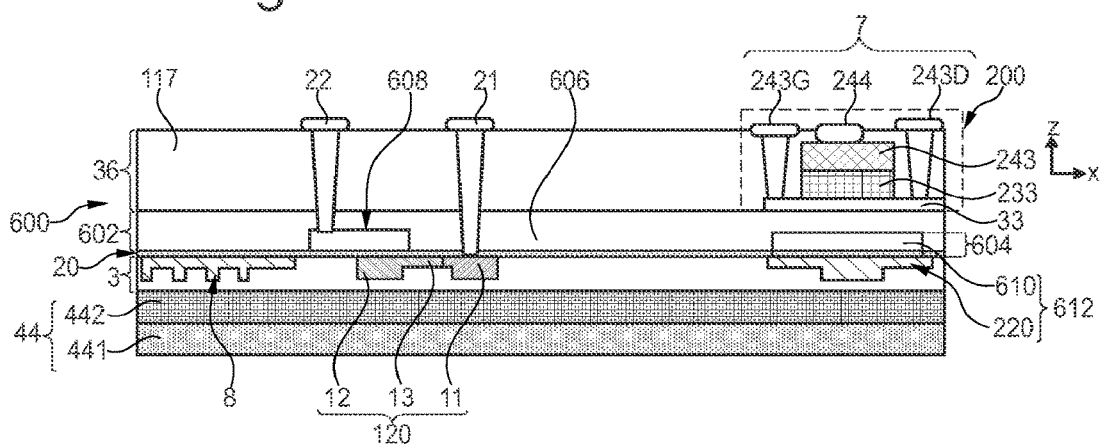

METHOD OF FABRICATING A MODULATOR OF THE PROPAGATION LOSSES AND OF THE INDEX OF PROPAGATION OF AN OPTICAL SIGNAL

The invention relates to a method of fabricating a modulator of the propagation losses and of the index of propagation of a guided optical signal and also to a modulator fabricated by this method.

"Propagation loss" denotes the optical losses experienced by the optical mode propagating in a waveguide within which it is guided.

'Index of propagation' denotes the effective index of propagation of the optical mode propagating in a waveguide within which it is guided.

Such known modulators comprise a waveguide formed by the stacking immediately on top of one another of:
  a proximal end of a first electrode,
  a thin dielectric layer, and
  a proximal end of a second electrode.

By applying a potential difference between the first and second electrodes, the density of charge carriers at the interfaces between the dielectric layer and the proximal ends of the first and second electrodes is modified. This leads to a modification of the propagation losses and of the index of propagation experienced by the guided optical field propagating in the waveguide. Typically, the dielectric layer is a layer of silicon dioxide.

The known methods of fabrication of such a modulator comprise:
  providing a stack successively comprising a base substrate, a buried layer of dielectric material and a semiconductor layer, the thickness of the buried layer being equal to $e_{2ini}$ to within approximately 5 nm, where $e_{2ini}$ is a constant, then
  etching the semiconductor layer so as to structure a first electrode of the modulator within this semiconductor layer, this first electrode having a proximal end, a distal end and an intermediate part which extends, in a transverse direction, from the proximal end up to the distal end so as to mechanically and electrically connect these ends, then
  encapsulating the structured semiconductor layer in a dielectric material so as to obtain a semiconductor layer encapsulated within a dielectric material in which layer the dielectric material extends, in the transverse direction, until it directly touches the proximal end of the first electrode, then
  bonding a substrate onto the encapsulated semiconductor layer, then
  forming a second electrode of the modulator having a proximal end facing the proximal end of the first electrode, these proximal ends being separated from each other only by a dielectric layer in such a manner as to form a waveguide able to guide the optical signal to be modulated.

For example, such a method of fabrication is disclosed in the application WO2011037686.

The method of the application WO 2011037686 is advantageous because it allows modulators to be fabricated in which the dielectric layer is thin, in other words less than 25 nm thick. This is advantageous because such a modulator then exhibits both a good modulation efficiency and low propagation losses.

On the other hand, the implementation of the known methods of fabrication described in these applications leads to modulators whose performance characteristics are dispersed. The term "performance characteristics" here denotes notably the bandwidth of the modulator and the modulation efficiency of this modulator. The modulation efficiency is the ratio between the variation in index of refraction induced per volt applied between the two electrodes of the modulator.

"Dispersion of the performance characteristics" denotes the fact that the performance characteristics vary from one modulator to another and do so even if all these modulators are fabricated by the same method of fabrication. Such variations are typically caused by inaccuracies during the fabrication process which modify, in a random and uncontrolled manner, the capacitance of the capacitor formed by the dielectric layer interposed between the two electrodes of the modulator, and the position of the maximum intensity of the optical field guided by the modulator. For example, the inaccuracy could be in the thickness of the dielectric layer or in the positions of the electrodes with respect to each other.

Prior art is also known from:
  US 2015/0055910A1,
  WO2005/091057A1,
  WO2015/194002A1,
  WO2013/155378A1,
  U.S. Pat. No. 8,363,986B2, and
  FR2867898.

The invention aims to provide a method of fabrication which reduces the dispersion in the performance characteristics of the modulators fabricated by this method. In other words, the objective is to obtain a method of fabrication which renders the performance characteristics of the modulators fabricated more repeatable. One of its subjects is therefore such a method in accordance with claim 1.

In the method claimed, the dielectric layer is directly formed by the buried layer constructed prior to the formation of the first electrode. The phrase "directly" formed by a buried layer denotes the fact that the dielectric layer is obtained without substantially modifying the initial thickness $e_{2ini}$ of the buried layer. The expression "without substantially modifying the initial thickness" denotes the fact that the initial thickness $e_{2ini}$ of the buried layer, which forms the dielectric layer interposed between the electrodes of the modulator, is neither increased nor decreased by more than $err_p$ with respect to its initial thickness $e_{2ini}$, where $err_p$ is a constant equal to 5 nm or 4 nm and, preferably, equal to 3 nm or 1 nm. In particular, in the method claimed, the dielectric layer is not the result of the formation on the first electrode of a layer of dielectric material, nor is it the result of the thinning of a thicker dielectric layer. For this reason, the thickness of the dielectric layer is controlled with an increased precision with respect to the known methods of fabrication of modulators. In addition, the thickness of the dielectric layer is more uniform. This results in the dispersion of the capacitance of the capacitor of the modulator being much lower when the method claimed is implemented than with the known methods of fabrication. This accordingly allows modulators whose performance characteristics are more repeatable to be fabricated. In particular, the bandwidth and the modulation efficiency of the modulators fabricated by the method claimed are much less dispersed than if they had been fabricated by a known method such as that described in the application WO 2011037686 or US 20150055910.

Moreover, the method claimed allows the first electrode of the modulator to be encapsulated in a dielectric material without having to leave an empty space next to this first electrode. This is particularly advantageous since, in the known methods such as that of the application US 20150055910 where such an empty space exists, this empty space is located under the second electrode. However, an empty space between the second electrode and the base substrate creates a stray capacitance which degrades the performance characteristics of the modulator.

The embodiments of this method of fabrication may comprise one or more of the features of the dependent claims.

The embodiments of the method of fabrication claimed may furthermore offer one or more of the following advantages:

- The method claimed allows a layer of thermal silicon oxide to be used as a dielectric layer, which improves the bonding of the second electrode and hence, ultimately, the performance characteristics of the modulator.
- The fact of having a proximal end thicker than the intermediate part of the same electrode renders the method less sensitive to the errors of positioning of one electrode with respect to the other electrode. More precisely, it allows a finer control of the position of the maximum intensity of the optical field guided by the modulator and hence the efficiency of the modulator fabricated. Thanks to this feature, the performance characteristics of the modulators fabricated are even more repeatable.
- The fact of having a more highly doped proximal end only in a region close to the dielectric layer allows, for the same performance characteristics, the propagation losses of the modulator fabricated to be reduced with equal access resistances, or the access resistance to be decreased with equal optical propagation losses, while at the same time keeping the distribution of the optical field unchanged.
- The fact that the thickness of the dielectric layer is less than 25 nm or 15 nm allows modulators with a good modulation efficiency to be obtained.
- The fact that the modulator and a laser source comprising a waveguide made of III-V material coupled to an optical waveguide via the same dielectric layer are fabricated at the same time furthermore allows the characteristics of this laser source to be made repeatable without adding any additional step to the method of fabrication of the modulator.

Another subject of the invention is a modulator in accordance with claim 9.

The invention will be better understood upon reading the description that follows, given solely by way of non-limiting example and presented with reference to the drawings, in which:

FIGS. 5 to 16 are schematic illustrations, as vertical cross sections, of various states of fabrication obtained during the implementation of the method in FIG. 4;

FIGS. 17 to 21 are schematic illustrations, as vertical cross sections, of other possible embodiments of the modulator in FIG. 3;

FIG. 22 is a schematic illustration, as a vertical cross section, of another embodiment of the transmitter in FIG. 1.

In these figures, the same references are used to identify the same elements. In the remainder of this description, the features and functions well known to those skilled in the art are not described in detail.

In this text, the expressions "the layer is made of material M", "layer of material M" or "M layer" denote a layer in which the material M represents at least 90%, and preferably at least 95% or 99%, of the mass of this layer.

Figure 1:
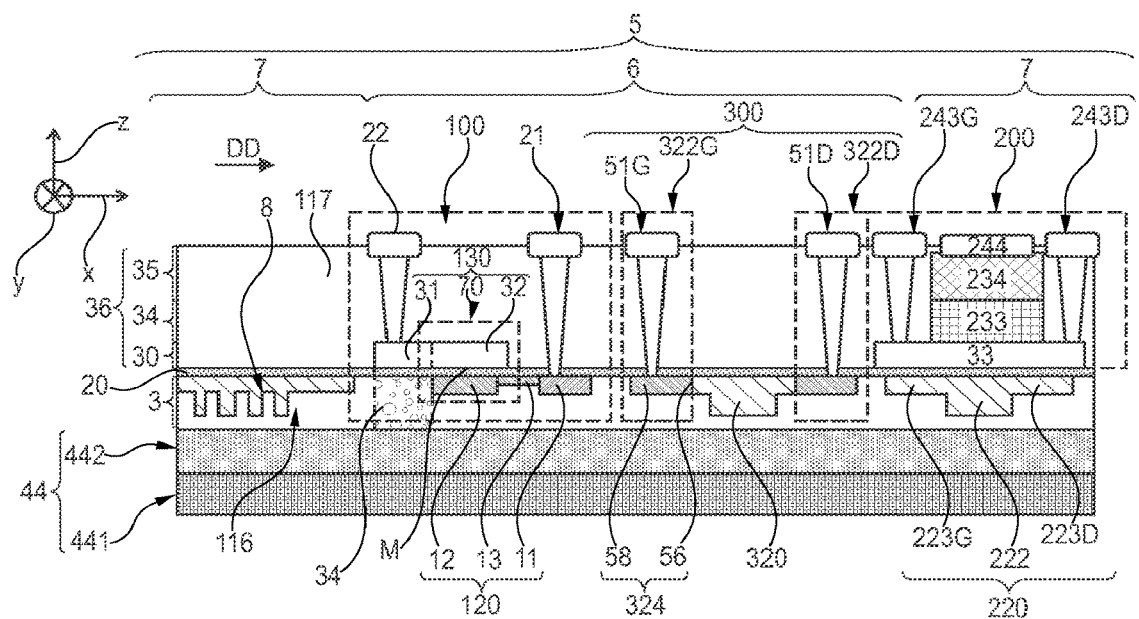
FIG. 1 is a schematic illustration of a transmitter as a vertical cross section.

FIG. 1 shows a transmitter 5 for an optical signal modulated in phase and/or in amplitude in order to transmit bits of information to a receiver by means of an optical fiber for example. For this purpose, the transmitter 5 comprises a laser source 7 which emits an optical signal whose phase and/or amplitude is subsequently modulated by a system 6 for phase and/or amplitude modulation of this optical signal.

For example, the wavelength $\lambda_{Li}$ of the optical signal emitted by the laser source 7 is in the range between 1250 nm and 1590 nm.

Typically, the laser source 7 is a DBR (distributed Bragg reflector) laser or DFB (distributed feedback) laser. Such a laser source is well known and only the details necessary for understanding the invention are described here. For example, for general details and the operation of such a laser source, the reader can refer to the following articles:

Xiankai Sun and Amnon Yariv: "Engineering supermode silicon/III-V hybrid waveguides for laser oscillation", Vol. 25, No. 6/June 2008/Journal of the Optical Society of America B.

B. Ben Bakir et al., "*Hybrid Si/III-V lasers with adiabatic coupling*", 2011.

B. Ben Bakir, C. Sciancalepore, A. Descos, H. Duprez, D. Bordel, L. Sanchez, C. Jany, K. Hassan, P. Brianceau, V. Carron, and S. Menezo, "*Heterogeneously Integrated III-V on Silicon Lasers*", Invited Talk ECS 2014.

In order to simplify FIG. 1 and the following figures, only a hybrid laser waveguide 200, 220 and a surface grating coupler 8 of the laser source 7 are shown.

Such a coupler 8 is for example described in the following article: F. Van Laere, G. Roelkens, J. Schrauwen, D. Taillaert, P. Dumon, W. Bogaerts, D. Van Thourhout and R. Baets, "*Compact grating couplers between optical fibers and Silicon-on-Insulator photonic wire waveguides with 69% coupling efficiency*". It is formed in an encapsulated semiconductor layer 3. By design, the coupler can emit upward or downward. In this description, it is inverted, but it may be chosen by design to make it emit upward or downward. The layer 3 here comprises structured single-crystal silicon encapsulated in a dielectric material 116. Generally speaking, a dielectric material has an electrical conductivity at 20° C. of less than $10^{-7}$ S/m and, preferably, less than $10^{-9}$ S/m or $10^{-15}$ S/m. In addition, in the case of the dielectric material 116, its index of refraction is strictly less than the index of refraction of silicon. For example, in this embodiment, the dielectric material 116 is silicon dioxide ($SiO_2$).

The layer 3 extends horizontally and directly over a rigid substrate 44. In the layer 3, the single-crystal silicon is situated in one and the same horizontal plane parallel to the plane of the substrate 44. Here, the single-crystal silicon of the layer 3 is also mechanically and electrically isolated from the substrate 44 by a thickness of the dielectric material 116. Typically, the maximum thickness of single-crystal silicon in the layer 3 is in the range between 100 nm and 800 nm. In this example, the maximum thickness of the single-crystal silicon in the layer 3 is equal to 500 nm.

In FIG. 1 and the following figures, the horizontal is represented by directions X and Y of an orthogonal reference frame. The direction Z of this orthogonal reference frame represents the vertical direction. In the following, the terms such as "upper", "lower", "above", "under", "high" and "low" are defined with respect to this direction Z. The terms "left" and "right" are defined with respect to the direction X. The terms "front" and "back" are defined with respect to the direction Y.

FIG. 1 shows the elements of the transmitter 5 in cross section in a vertical plane parallel to the directions X and Z.

The substrate 44 extends horizontally. It is formed of a successive stacking of a base substrate 441 and of a layer 442 of dielectric material. The thickness of the base substrate 441 is typically greater than 80 µm or 400 µm. For example, the base substrate 441 is a silicon base substrate. The layer 442 is made of silicon dioxide. The thickness of the layer 442 is typically greater than 500 nm or 1 µm or even more.

The hybrid laser waveguide 200, 220 is composed of a waveguide 200 formed from a III-V gain material and from a waveguide 220 made of single-crystal silicon. Generally speaking, the waveguide 200 is used for generating and amplifying an optical signal inside of an optical cavity of the laser source 7. Here, for this purpose, it is formed in a layer 36 comprising a III-V gain material encapsulated in a dielectric material 117. For example, the material 117 is silicon dioxide or silicon nitride. This layer 36 extends horizontally directly over a dielectric layer 20. The layer itself extends horizontally directly over an upper face of the layer 3.

The thickness of the layer 20 is typically in the range between 5 nm and nm and, preferably, between 10 nm and 25 nm. Here, the thickness of the layer 20 is equal to 20 nm.

The layer 36 typically comprises a doped lower sub-layer 30, a stack 34 of quantum wells or quantum dots made of a quaternary alloy and an upper sub-layer 35 doped with a dopant of opposite sign to that of the sub-layer 30. The sub-layers 30 and 35 here are formed of doped InP.

In FIG. 1, only a strip 33, a stack 233 and a strip 234 formed, respectively, in the sub-layer 30, the stack 34 and the sub-layer 35 are shown. This superposition of the strip 33, the stack 233 and the strip 234 constitutes the waveguide 200.

The waveguide 200 also comprises:
bump contacts 243G and 243D in direct mechanical and electrical contact with the strip 33 and situated, respectively, to the left and to the right of the stack 233, and
a bump contact 244 in direct mechanical and electrical contact with the strip 234.

These contacts 243G, 243D and 244 allow an electrical current to be injected into the stack 233 between the contacts 243G, 243D and the contact 244.

The waveguide 220 is formed in the single-crystal silicon of the layer 3. This waveguide 220 extends under the strip 33. Typically, its thickness and its width vary along Y as described in the article previously cited by Ben Bakir et al. In FIG. 1, the waveguide 220 is shown, by way of illustration, in the particular case where the direction of propagation of the optical signal inside of this waveguide is parallel to the direction Y. For example, for this purpose, the waveguide 220 adopts a configuration known by the term "rib". Thus, the transverse cross section of this waveguide, parallel to the plane XZ, has a central spine 222 from which thinner lateral arms 223G and 223D extend on either side, parallel to the direction X. Here, the waveguide 220 is separated from the strip 33 only by a portion of the layer 20. For example, the waveguide 220 is optically connected to the waveguide 200 by an adiabatic or evanescent coupling. For a detailed description of an adiabatic coupling the reader can refer to the article previously cited by X. Sun and A. Yariv or to the following article: Amnon Yariv et al., "*Supermode Si/III-V hybrid lasers, optical amplifiers and modulators: proposal and analysis*" Optics Express 9147, vol. 14, No. 15, Jul. 23, 2007. The characteristics of the optical coupling between the waveguide 220 and the waveguide 200 depend notably on the dimensions of the waveguide 220 and, in particular, on the thickness of the central spine 222. It is therefore important that the thickness of this spine 222 can be adjusted independently of the dimensions of the other photonic components formed on the same substrate 44. For example, here, the thickness of the spine 222 is equal to the maximum thickness of the single-crystal silicon in the layer 3, in other words here to 500 nm.

The system 6 may be a system for modulation of the phase only, or of the amplitude only or simultaneously of the phase and of the amplitude. In order to modulate the phase or the amplitude of the optical signal, the system 6 comprises at least one modulator of the propagation losses and of the index of propagation of a guided optical signal, and, often, at least one phase-matching device. For example, the system 6 is a Mach-Zehnder interferometer in which the modulator 100 and the phase-matching device 300 are arranged in one of the branches of this interferometer for modulating the amplitude and/or the phase of the optical signal generated by the laser source 7. The structure of a Mach-Zehnder interferometer is well known and is not described here. Accordingly, in order to simplify FIG. 1, only one modulator 100 and one phase-matching device 300 are shown.

Figure 2:
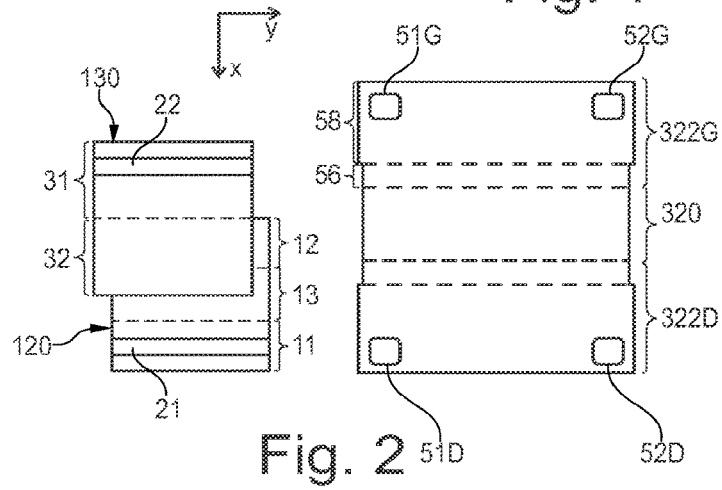
FIG. 2 is a schematic illustration, seen from above, of a modulator and of a phase-matching device of the transmitter in FIG. 1.

The device 300 allows the phase of an optical signal propagating parallel to the direction Y inside of a waveguide 320 to be adjusted. For example, the waveguide 320 is longer in the direction Y than it is wide in the direction X. The waveguide 320 is formed from the single-crystal silicon of the layer 3. Here, its thickness is for example equal to the thickness of the bulging part 222. The index of refraction of silicon varies strongly as a function of temperature. Thus, by varying the temperature of the waveguide 320, the index of propagation of the optical signal in this waveguide may be modified and hence the phase of the optical signal adjusted. For this purpose, the device 300 comprises two heaters 322G and 322D each disposed on one respective side of the waveguide 320. Here, the heater 322D can be derived from the heater 322G by symmetry with respect to a vertical plane parallel to the directions Y and Z and going through the middle of the waveguide 320. Thus, only the heater 322G will now be described in more detail with reference to FIGS. 1 and 2.

The heater 322G comprises an arm 324 which extends, parallel to the direction X, from a proximal end 56 up to a distal end 58. The arm 324 also extends parallel to the direction Y. The arm 324 is formed from the single-crystal silicon of the layer 3.

The proximal end 56 is in direct mechanical contact with the waveguide 320. Here, the proximal end 56 touches one vertical side of the waveguide 320. For this purpose, the arm 324 and the waveguide 320 form a single block of material.

The thickness of the proximal end 56 is less than the maximum thickness of the waveguide 320 in such a manner as to confine the optical signal within the waveguide 320. For example, the thickness of the proximal end 56 is 1.5 times or two times or three times or four times smaller than the maximum thickness of the waveguide 320.

The distal end 58 is doped in order to render the single-crystal silicon resistive and to form an electrical resistance which forms a single block of material with the waveguide 320. In FIG. 1, the doped regions of the single-crystal silicon are finely hatched and appear dark. The shortest distance between this doped region of the arm 324 and the waveguide 320 is, for example, strictly greater than 200 nm or 400 nm.

In order to make an electrical current flow inside the distal end 58, the heater 322G also comprises two bump contacts 51G and 52G in direct mechanical and electrical contact with the distal end 58. Here, these contacts 51G and 52G are situated one behind the other in the direction Y and at each end of the distal end 58 in this direction Y. The bump contacts of the heater 322D, shown in FIG. 2, respectively carry the references 51D and 52D.

When a current, conducted via the contacts 51G and 52G, passes through the distal end 58, the latter transforms a part of the electrical energy thus received into heat which propagates by thermal conduction through the proximal end 56 as far as the waveguide 320. Thus, the heater 322G allows the waveguide 320 to be heated without any resistive element being implanted in the waveguide 320 or in immediate proximity to this waveguide. The device 300 allows the phase of the optical signal in the waveguide 320 to be adjusted slowly. On the other hand, it does not allow a fast variation of the phase of the optical signal.

Conversely, the modulator 100 allows a fast modification of the phase of the optical signal. For this purpose, it comprises two electrodes 120 and 130. These electrodes 120 and 130 can also be seen, as a top view, in FIG. 2.

The electrode 120 is formed from the single-crystal silicon of the layer 3. It extends, in the direction X, from a proximal end 12 up to a distal end 11 going via a thinned intermediate part 13. It also extends in the direction Y. In the direction Y, its transverse cross section remains constant. Parallel to the plane XZ, the transverse cross sections of the ends 11 and 12 and of the intermediate part 13 are each rectangular. The ends 11, 12 and the intermediate part 13 are flush with the plane upper face of the layer 3. The ends 11, 12 and the intermediate part 13 are therefore in direct contact with the lower face of the layer 20.

The intermediate part 13 connects the ends 11 and 12 together, both mechanically and electrically. Its thickness $e_{13}$ is chosen in such a manner as to laterally confine (cross section X-Z) the intensity distribution of the optical field within the proximal end 12. For this purpose, the thickness $e_{13}$ is less than $0.8e_{12}$ and preferably less than $0.5e_{12}$ or than $0.25e_{12}$, where $e_{12}$ is the maximum thickness of the end 12. The thickness $e_{13}$ is also typically greater than 70 nm in order to decrease the electrical resistance between the ends 11 and 12. This resistance is referred to as the "access resistance". For this purpose, the thickness $e_{13}$ is often greater than $0.1e_{12}$ or $0.15e_{12}$. Here, the thickness $e_{11}$ of the distal end 11 is equal to the thickness $e_{12}$. In this embodiment, the thickness $e_{12}$ is equal to 300 nm and the thickness $e_{13}$ is equal to 150 nm or 100 nm. The horizontal lower face of the intermediate part 13 is separated from the substrate 44 only by the dielectric material 116.

Here, the distal end 11 is more highly doped than the proximal end 12. For example, the concentration of dopant in the end 11 is in the range between $10^{17}$ and $2\times10^{19}$ atoms/cm$^3$. The concentration of dopant in the end 12 is for example in the range between $10^{17}$ and $2\times10^{18}$ atoms/cm$^3$.

The electrode 130 is made of a doped semiconductor material with a doping of opposite sign to that of the electrode 120. Here, it is formed from InP in the sub-layer 30. The dopant concentration of the electrode 130 is, for example, in the range between $10^{17}$ and $2\times10^{18}$ atoms/cm$^3$ or between $10^{17}$ and $5\times10^{18}$ atoms/cm$^3$.

The electrode 130 extends, parallel to the direction X, from a proximal end 32 up to a distal end 31. The electrode 130 also extends in the direction Y. It is directly situated on the layer 20. Parallel to the plane XZ, its transverse cross section is rectangular. In the direction Y, this transverse cross section is constant.

Figure 3:
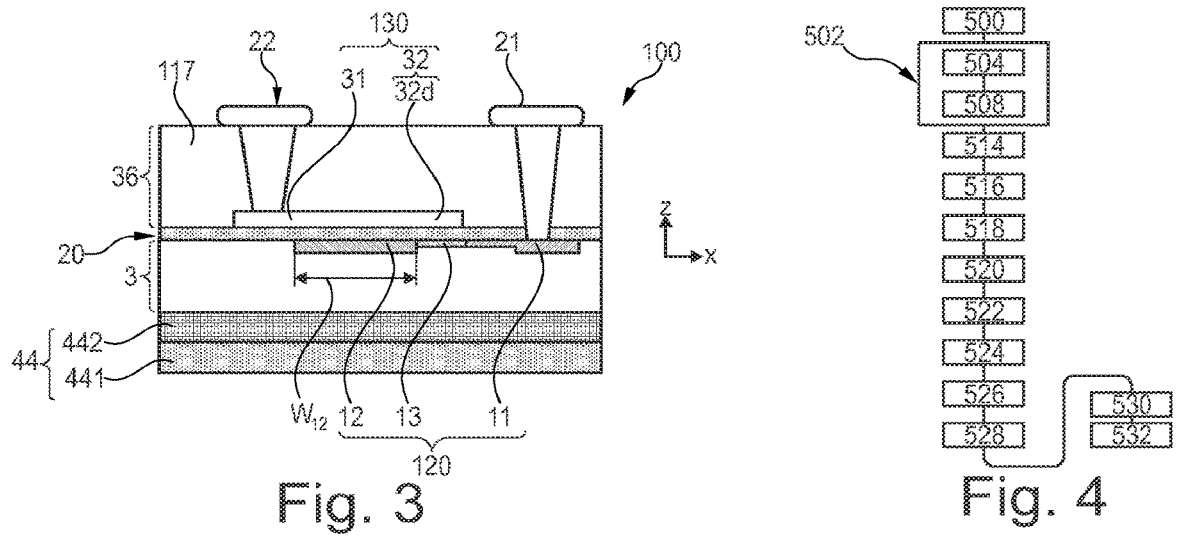
FIG. 3 is an enlarged illustration, as a vertical cross section, of the modulator of the transmitter in FIG. 1.

The proximal end 32 is situated facing the proximal end 12 and extends beyond this end 12, in the direction X, in such a manner as to exhibit a protrusion 32$d$ (FIG. 3) facing the intermediate part 13. Typically, the protrusion 32$d$ is at least 5 nm or 10 nm or 25 nm long in the direction X. The proximal end 32 is separated from the proximal end 12 and from the intermediate part 13 only by a portion of the layer 20 interposed between these proximal ends.

With respect to a vertical plane parallel to the directions Y and Z and going through the ends 12 and 32, the distal end 31 is situated on one side of this plane, whereas the distal end 11 is situated on the other side. The ends 11 and 31 are not, therefore, facing each other.

In the embodiment in FIG. 1 and the following embodiments, the region 34, which extends vertically from the end 31 down to the substrate 44, only comprises solid dielectric materials. Here, these are dielectric materials 116 and the layer 20. In FIG. 1, the region 34 has been highlighted by filling it with circles. However, there is no discontinuity between the dielectric materials situated inside of the region 34 and those situated outside of this region 34.

The superposition, in the direction Z, of the end 12, of a portion of the layer 20 and of the end 32 is dimensioned in order to form a waveguide 70 capable of guiding the optical signal generated by the laser source 7 in the direction Y. The waveguides 70 and 320 are for example optically connected together via an adiabatic coupler not shown here.

The maximum thickness of the proximal ends 12 and 32 is chosen such that the point M, where the maximum intensity of the optical field of the optical signal propagating in the waveguide 70 is located, is as close as possible to the layer 20. Preferably, the point M is situated at the center of the portion of this layer 20 interposed between the ends 12 and 32. Indeed, it is at the interfaces between the ends 12, 32 and the layer 20 that the density of charge carriers is maximal when a potential difference is present between these proximal ends. Thus, by placing the point M at this location, the efficiency of the modulator 100 is improved. The maximum thickness $e_{32}$ of the proximal end 32 is generally in the range between 50 nm and 300 nm. In this embodiment, the indices of refraction of the ends 12 and 32 are close to one another. Accordingly, the maximum thicknesses of the ends 12 and 32 are chosen to be substantially equal so that the point M is situated inside of the layer 20. For example, the maximum thickness $e_{12}$ of the proximal end 12 is in the range between $0.5e_{32}$ and $1.5e_{32}$, and, preferably, between $0.7e_{32}$ and $1.3e_{32}$. Here, the thicknesses $e_{12}$ and $e_{32}$ are chosen to both be equal to 300 nm.

The intermediate part 13 allows a better control of the position of the point M in the direction X and hence limits the dispersion in the performance characteristics of the modulators 100 during their fabrication. More precisely, the position of the point M in the direction X is essentially fixed by the width $W_{12}$ (FIG. 3) of the proximal end 12 in the direction X. Indeed, the limited thickness $e_{13}$ of the intermediate part 13 confines the optical signal inside the end 12. The width $W_{12}$ is, by etching, defined to within +/−δ, where δ is an error equal, typically, to +/−5 nm, or +/−10 nm. Conversely, if the intermediate part 13 has the same thickness as the end 12, the width $W_{12}$ is defined by the width of the coverage of the electrodes 130 and 120. However, the positioning of the electrode 130 is determined, for its part, by lithographic alignment with a precision δal typically equal to +/−25 nm, or +/−50 nm. Hence, in the absence of a thinned intermediate part, the error on the width $W_{12}$ is +/−δal and the dispersion in the performance characteristics of the modulators 100 is greater. This configuration of the electrode 120 therefore allows a lower sensitivity to the errors in positioning of the electrode 130. In particular, the modulation efficiency depends directly on the width $W_{12}$. As a consequence, the modulation efficiency is less dispersed thanks to the intermediate part 13 and to the protrusion 32d.

Furthermore, this embodiment also allows a better control of the capacitance of the modulator.

The modulator 100 also comprises two bump contacts 21 and 22, in direct mechanical and electrical contact with the distal ends 11 and 31, respectively. These contacts 21 and 22 are connected to a source of voltage controllable as a function of the bit or bits of information to be transmitted by the transmitter 5.

One possible operation of the transmitter 5 is as follows. The laser source 7 generates an optical signal. At least a part of this optical signal is directed toward a Mach-Zehnder interferometer at least one of the branches of which comprises, successively, the modulator 100 and the phase-matching device 300. This part of the optical signal is therefore successively guided by the waveguide 70, then the waveguide 320, before being recombined with another part of the optical signal guided by the other branch of the Mach-Zehnder interferometer so as to form the modulated optical signal. For example, the waveguides 70 and 320 are optically coupled together via an adiabatic coupler. At the output of the Mach-Zehnder interferometer, the optical field may be coupled to an optical fiber via a waveguide similar to the waveguide 320, then by the surface grating coupler 8.

A method of fabrication of the transmitter 100 will now be described with reference to FIGS. 4 to 16. FIGS. 5 to 16 show various states of fabrication of the transmitter 5 as a vertical cross section parallel to the directions X and Z.

During a step 500, the method begins by providing a substrate 4 (FIG. 5). Here, this substrate 4 is an SOI (silicon-on-insulator) substrate. The substrate 4 comprises, directly stacked one on top of the other in the direction Z:
- a base substrate 1 of silicon, conventionally with a thickness greater than 400 μm or 700 μm,
- a buried layer 2 of thermal silicon dioxide of thickness $e_{2ini}$, and
- a layer 43 of single-crystal silicon which, at this stage, has not yet been etched or encapsulated in a dielectric material.

The thermal silicon dioxide is an oxide of silicon obtained by oxidation of the base substrate 1 at a high temperature, in other words higher than 650° C. or 800° C. By virtue of the nature of this oxide, the layer 2 exhibits two noteworthy properties:
1) its thickness, even when it is thin, remains uniform, and
2) it allows a direct bonding of better quality to be obtained.

The "uniform" thickness of the layer 2 means that, at any point on the layer 2, its thickness is in the range between $e_{2ini}-err_{2ini}$ nm and $e_{2ini}+err_{2ini}$ nm, where:
- $e_{2ini}$ is a constant, typically equal to the average thickness of the layer 2, and
- $err_{2ini}$ is a constant less than or equal to 5 nm and, preferably, equal to 3 nm or 1 nm.

Direct bonding is a method of bonding in which two wafers are bonded directly onto each other without adding an intermediate layer of adhesive. The bonding results from the appearance of chemical bonds directly between the two faces of these wafers. Generally, after having been brought into mechanical contact with one another, the wafers undergo a thermal treatment in order to reinforce the bonding.

Generally, the thickness $e_{2ini}$ is greater than 7 nm or 10 nm and, typically, less than 100 nm or 50 nm. Here, the initial thickness $e_{2ini}$ of the layer 2 is equal to 20 nm+/−1 nm and the thickness of the layer 43 is equal to 500 nm. Such a thickness $e_{2ini}$ and such a precision on the thickness of the layer 2 is obtained by the conventional methods of fabrication of SOI substrates.

During a step 502, a localized doping of the layer 43 is carried out. Here, a first localized doping operation 504 is initially carried out, during which doped regions 506 (FIG. 6) with the same doping are formed in the layer 43. These regions 506 are only formed at the locations of the future arms of the matching device 300 and of the electrode 120 of the modulator 100. These regions 506 have a doping level equal to that of the distal end 58 and of the proximal end 12.

Subsequently, a second operation 508 for doping of the layer 43 is carried out in such a manner as to obtain a region 510 (FIG. 7) more highly doped than the regions 506. The region 510 here is partially superposed onto one of the regions 506. For example, the region 510 is obtained by applying a new implantation on a part of one of the regions 506. The region 510 is formed at the location of the future distal end 11 of the electrode 120. The doping of the region 510 here is equal to the doping of the distal end 11.

During a step 514, the layer 43 undergoes a first localized partial etching (FIG. 8) so as to thin the thickness of the silicon at the locations of the electrode 120 and of the arms 324 of the heaters 322G and 322D. At the end of the step 514, the regions 506 and 510 are thinned and have a thickness less than the initial thickness of the layer 43. Here, the thickness of the thinned regions 506 and 510 is equal to the thickness of the electrode 120 and of the arms 324, in other words 300 nm.

During this first localized partial etching, the thickness of the layer 43 is also thinned in non-doped regions, for example in order to form the patterns of the future surface grating coupler 8 and the lateral arms 223G and 223D of the waveguide 220. On the other hand, during this step 514, other regions referred to as "non-thinned" are not etched and conserve their initial thickness. In particular, these non-thinned regions are situated at the location of the spine 222 of the waveguide 220 and at the location of the waveguide 320.

Still during this step 514, the layer 43 subsequently undergoes a second localized partial etching in order to thin the thickness of the silicon only at the location of the future intermediate part 13. At the end of this second localized partial etching, the thickness of the layer 43 at the location of the future intermediate part 13 is 150 nm.

During a step 516, a localized total etching of the layer 43 is carried out (FIG. 9). In contrast to the partial etching, the total etching completely eliminates the thickness of silicon of the layer 43 in the unmasked regions where it is applied. Conversely, masked regions protect the layer 43 from this total etching. This total etching is carried out in such a manner as to structure, simultaneously in the layer 43, the waveguides 220 and 320, the arms of the matching device 300, the surface grating coupler 8 and the electrode 120. For this purpose, only the regions corresponding to these various elements are masked. At the end of this step, the state shown in FIG. 9 is obtained.

During a step 518, the layer 43 of single-crystal silicon, which has been structured during the preceding steps, is encapsulated in silicon dioxide 116 (FIG. 10). The layer 3 is then obtained comprising structured single-crystal silicon encapsulated in the dielectric material 116. The upper face of the material 116 is subsequently prepared for bonding, for example for direct or molecular bonding. For example, the upper face of the material 116 is polished by means of a method such as a CMP (Chemical-Mechanical Polishing) method.

During a step 520, the upper face of the substrate 4, in other words at this stage the polished face of the material 116, is subsequently bonded onto the outer face of the substrate 44 (FIG. 11), for example by direct or molecular bonding. The substrate 44 has already been described with reference to FIG. 1.

During a step 522 (FIG. 12), the base substrate 1 is removed in order to expose a face of the layer 2 and this is done without substantially modifying the initial thickness $e_{2ini}$ of the layer 2. For this purpose, the base substrate 1 is eliminated via two successive operations: a first operation for coarse removal of the majority of the thickness of the base substrate 1 so as to leave only a residual thin layer of the base substrate 1 remaining on the layer 2. Typically, after the first operation, the thickness of this residual layer is less than 40 µm or 30 µm. This first operation is referred to as "coarse" since the precision on the thickness of the residual thin layer is rough, in other words greater than ±0.5 µm or ±1 µm but, generally, still less than ±4 µm and, preferably, less than ±3 µm. Given that the precision required on the thickness of the residual thin layer is rough, a quick or low-cost method of removal may be used. Typically, the operation for coarse removal is an operation for thinning of the base substrate 1 by mechanical polishing. Here, at the end of this first operation, the residual thin layer has a thickness of 20 µm to within ±2 µm.

Subsequently, a second finishing operation is implemented in order to completely eliminate the residual thin layer of the base substrate 1 without modifying the thickness of the layer 2. Typically, the second operation is a very selective chemical etching operation. The description "very selective" denotes the fact that the chemical agent used during this operation etches the base substrate 1 at least 500 times, and preferably at least 1000 or 2000 times, faster than the layer 2. Here, the chemical agent used is TMAH (Tetramethylammonium hydroxide). TMAH etches silicon 2000 times faster than thermal silicon oxide. In this embodiment, in order to be sure of removing the entirety of the residual thin layer, the very selective etching is adapted so as to etch 22 µm of silicon, i.e. 2 µm more than the theoretical thickness of the residual thin layer. This choice leads, in the worst case scenario, to an over-etching of 2 nm (=2 µm/2000) of the thickness of the layer 2. Indeed, since the thickness of the residual thin layer is 20 µm±2 µm, this means that in some places the thickness may be 18 µm. If it is planned to etch 22 µm, then the over-etching at the location where the thickness is 18 µm may reach 4 µm. Hence, the over-etching of layer 2 at this point is of 2 nm. Thus, after the step 522, the layer 2 is exposed and forms the layer 20. Its thickness is equal to 20 nm±3 nm, in other words ±1 nm due to the imprecision on the initial thickness $e_{2ini}$ of the layer 2 to which the imprecision of ±2 nm due to the over-etching is added. With respect to other methods of obtaining a thin layer, this method has the advantage of providing a thin layer whose thickness is much more uniform. Indeed, when the thin layer is obtained by thinning of a thicker layer of oxide or by growth of a thin layer of oxide on a face of an encapsulated structured layer (see for example WO2011037686 or US2015055910), the thickness is much less uniform. Typically, with the known methods, the thickness of the layer of oxide is controlled, at best, to within ±10 nm or ±20 nm.

For this reason, the dispersion in the performance characteristics of the modulators fabricated according to this method is much smaller than that obtained with the known methods.

Lastly, advantageously, outgassing cavities are sunk into the layer 20 outside of the locations where the electrode 130 and the strip 33 are to be formed. Typically, these cavities traverse the layer 20 vertically from one side to the other. Their role is to trap the gaseous elements generated during the direct bonding of a layer onto the layer 20. Thus, these cavities allow a bonding of better quality to be obtained on the layer 20. In order to simplify the figures, these cavities have not been shown in these figures.

At the end of the step 522, a stack of the substrate 44 and of the layers 3 and (FIG. 12) is obtained.

During a step 524, a layer 36A (FIG. 13) of III-V gain material is formed on the layer 20. For example, the layer 36A is bonded onto the layer 20 on top of the waveguide 220 and of the electrode 120. The layer 36A comprises the sub-layer 30 of doped InP with a doping of opposite sign to that of the electrode 120, the stack 34 and the sub-layer 35.

During a step 526, a localized etching (FIG. 14) of the sub-layer 35 and of the stack 34 is carried out in order to structure the strip 234 in the sub-layer 35 and the stack 233 in the stack 34. During this step, the sub-layer 30 is not etched.

During a step 528, a localized total etching (FIG. 15) of the sub-layer 30 is carried out in order to simultaneously structure the strip 33 and the electrode 130 in this sub-layer. The precision δal of the positioning of the electrode 130 with respect to the electrode 120 depends on the tools and techniques used to perform this step. This precision δal is therefore known in advance. The length of the protrusion 32d of the electrode 130 depends on this precision δal. Here, the desired position of the electrode 130 is chosen in such a manner that the target length of this protrusion 32d is greater than or equal to the absolute value of the precision δal. Thus, irrespective of the error in positioning which occurs during the fabrication of the modulator 100, the protrusion 32d is systematically created as long as the alignment error remains within the predictable range ±δal.

During the step 528, a part or the entirety of the thickness of the layer 20 situated between the electrode 130 and the strip 33 may be removed. However, this has no consequence on the thickness of the portions of the layer 20 interposed between the electrodes 120 and 130 and between the waveguide 220 and the strip 33.

During a step 530, the structured layer 36A is encapsulated (FIG. 16) in the dielectric material 117. The layer 36 comprising the III-V gain material encapsulated in the dielectric material 117 is then obtained.

Lastly, during a step 532, the bump contacts 21, 22, 51G, 52G, 51D, 52D, 243G and 243D are formed. The transmitter 5 such as is shown in FIG. 1 is then obtained.

This method of fabrication offers numerous advantages. In particular:
  It allows the thickness of the layer 20 to be precisely controlled and a particularly plane layer 20 to be obtained because said layer is formed on the side of the layer 3 which has the same level everywhere, which simplifies the bonding of the layer 36A.
  It allows the thickness of the electrode 120 to be adjusted independently of the thickness of the waveguide 220 and, more generally, independently of the thickness of the layer 43 of single-crystal silicon. This is particularly useful since, generally speaking, in order to improve the operation of the laser source 7, the waveguide 220 must be thick enough, in other words here of the order of 500 nm, and the strip 33 must be thin enough, in other words here of the order of 300 nm or 150 nm. Conversely, in order to improve the operation of the modulator 100, as explained hereinabove, the thickness of the electrode 120 and, in particular, of its proximal end 12, must be chosen as a function of the thickness of the proximal end 32. Here, the thickness of the proximal end 32 is imposed by the thickness of the sub-layer 30 of crystalline InP. It is therefore 300 nm or 150 nm.

This method does not increase the complexity of the fabrication of the transmitter 5. For example, it allows the strip 33 of the waveguide 200 and the electrode 130 of the modulator 100 to be formed in one and the same etching operation. Similarly, the electrode 120 and the waveguide 220 are fabricated simultaneously during the same etching operation.

Figure 17:
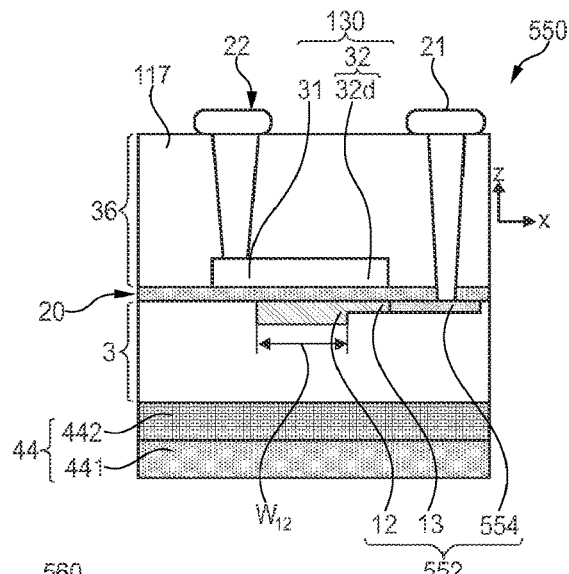

FIG. 17 shows a modulator 550 able to replace the modulator 100. The modulator 550 is identical to the modulator 100 except that the electrode 120 is replaced by an electrode 552. The electrode 552 is identical to the electrode 120 except that the distal end 11 is replaced by a distal end 554 whose thickness is equal to the thickness $e_{13}$ of the intermediate part 13. Thus, the distal end 554 and the intermediate part 13 are a continuation of each other and form only a single block of rectangular transverse cross section.

Figure 18:
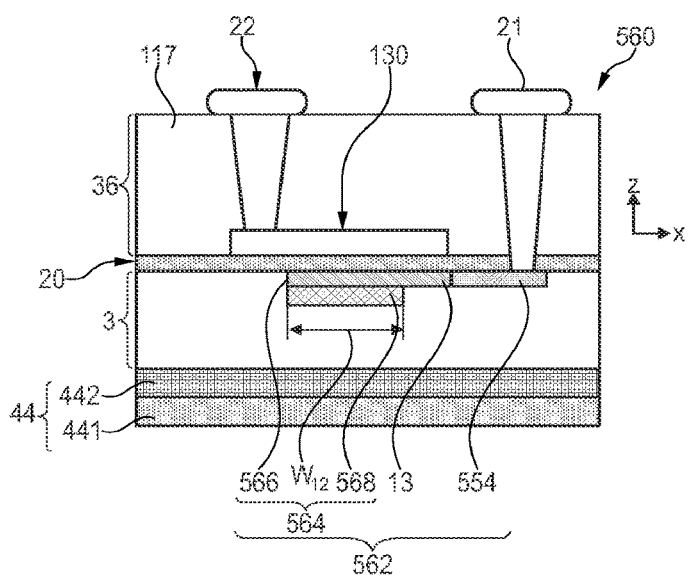

FIG. 18 shows a modulator 560 able to replace the modulator 100. The modulator 560 is identical to the modulator 550 except that the electrode 552 is replaced by an electrode 562. The electrode 562 is identical to the electrode 552 except that the proximal end 12 is replaced by a proximal end 564. The proximal end 564 is identical to the proximal end 12 except that it comprises a more highly doped region 566 and a more lightly doped region 568 stacked on top of one another in the direction Z. The region 566 is directly in contact with the layer 20. The region 568 is situated on the side opposite to the layer 20. The doping of the region 566 is the same as that described for the proximal end 12 so as to conserve the same modulation efficiency. The doping of the region 566 or 568 denotes the mean density per unit volume of dopants in this region. In order to limit the access resistance, while at the same time limiting the optical losses inside the waveguide, the thickness $e_{566}$ of the region 566 is preferably equal to the thickness $e_{13}$ of the intermediate part 13 to within ±10% or ±5%. Its thickness is also generally greater than 70 nm. Here, its thickness is equal to the thickness $e_{13}$.

The doping of the region 568 is at least two times lower, and preferably 4 or times lower, than the doping of the region 566. Typically, the region 568 is not doped or very lightly doped.

The thickness of the region 568 is equal to $e_{12}-e_{566}$. This configuration of the doping of the proximal end 564 allows the propagation losses in the modulator 560 to be reduced without substantially modifying its other performance characteristics such as the modulation efficiency and the modulation speed, nor does this modify the access resistance at the proximal end 564. Such a configuration of the doping of the proximal end 564 is, for example, carried out during the step 502, in other words by implementing a doping at the location of the proximal electrode 564 in the layer 43 of silicon such that only the region 566 is doped. For example, the regions 566 and 568 are obtained by varying the energy of implantation of the dopant and the dose of dopant implanted so as to adjust both the density of dopants and the depth at which the maximum density of dopants is situated.

FIG. 19 shows a modulator 570 able to replace the modulator 100. The modulator 570 is identical to the modulator 100 except that the electrode 120 is replaced by an electrode 572. The electrode 572 is identical to the electrode 120 except that the intermediate part 13 is replaced by an intermediate part 574. The thickness of the intermediate part 574 is equal to the thickness $e_{12}$. In this embodiment, the repeatability of the performance characteristics of the modulator 570 is therefore obtained only by virtue of the better control of the thickness of the layer 20.

FIG. 20 shows a modulator 580 able to replace the modulator 100. This modulator 580 is identical to the modulator 100 except that the electrode 130 is replaced by an electrode 582. The electrode 582 is identical to the electrode 130 except that a thinned intermediate part 584 is introduced between the proximal end 32 and distal end 31. The intermediate part 584 is, for example, structurally identical to the intermediate part 13.

In addition, in this embodiment, the proximal end 32 is more lightly doped than the distal end 31. Such a different doping between the ends 31 and 32 may be obtained by carrying out a step for localized doping on the end 31 just after the step 528 and prior to the step 530.

In this embodiment, as in the previous embodiments, the distal end 32 comprises the protrusion 32d which is situated above the intermediate part 13 of the electrode 120. Under these conditions, the position of the maximum intensity of the optical field in the direction X is still controlled by the width $W_{12}$ of the proximal end 12.

FIG. 21 shows a modulator 590 able to replace the modulator 100. The modulator 590 is identical to the modulator 580 except that the electrode 120 is replaced by an electrode 592. The electrode 592 is identical to the electrode 572 of the modulator 570. The electrode 592 has a protrusion 12d which extends, in the direction X, underneath the intermediate part 584. This protrusion 12d is configured like the protrusion 32d. Thus, in this embodiment, the position of the maximum intensity of the optical field guided by the modulator is controlled by the width $W_{32}$ of the proximal electrode 32 rather than by the width of the proximal end 12. This offers the same advantages in terms of repeatability of the performance characteristics of the modulators fabricated as what has already been explained in the case of the embodiment in FIG. 1 and of the proximal end 12.

Figure 4:
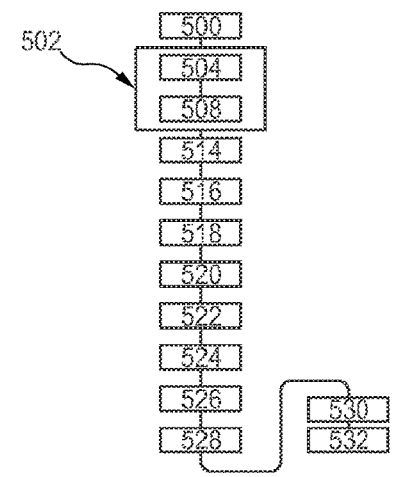
FIG. 4 is a flow diagram of a method of fabrication of the transmitter in FIG. 1.
Figure 15:
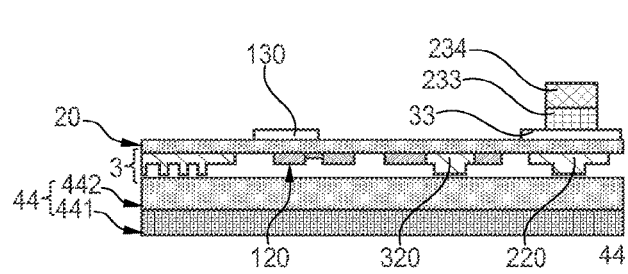
Figure 16:
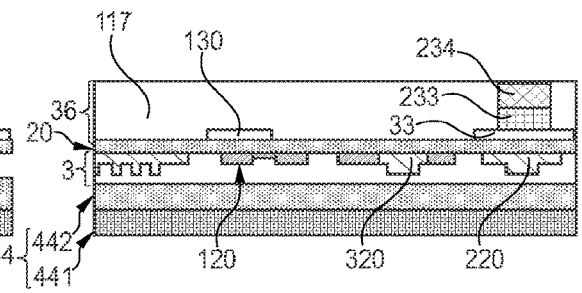

The method of fabrication of the modulator 590 is for example identical to that in FIG. 4 except that:
  during the step 514, the second localized partial etching intended to thin the intermediate part 13 is omitted, and
  during the step 528, a second localized partial etching able to thin the intermediate part 584 is implemented in addition to the localized total etching.

FIG. 22 shows a transmitter 600 identical to the transmitter 5 except that an encapsulated semiconductor layer 602 is interposed between the layer 20 and the layer 36. The layer 602 comprises a structured semiconductor layer 604 encapsulated in silicon oxide. The layer 604 is directly in contact with the layer 20. Here, the layer 604 is a layer of polycrystalline silicon (polysilicon). This layer is structured, for example by localized total etches such as those previously described, in order to form an electrode 608 of the modulator and a spine 610 of the laser source. The electrode 608 is for example identical to the electrode 130 except that it is made from polysilicon. The electrode 608 is doped by implantation after etching. The spine 610 is not doped.

The spine 610 is situated on top of the waveguide 220 and optically coupled to this waveguide 220 through the layer 20 so as to form a bi-material waveguide 612. Here, the bi-material waveguide 612 is formed from single-crystal silicon and from polysilicon.

The waveguide 200 made of III-V material is directly deposited or bonded onto the layer 602 on top of the bi-material waveguide 612 and optically coupled to this waveguide 612. In this embodiment, the electrode 608 is not formed from the same material as that of the strip 33 of the waveguide 200.

Variants of the Modulator:

The modulator 100 may be a ring modulator. For this purpose, the waveguide 70 is closed on itself so as to form an annular waveguide in which the density of the charge carriers may be modified as a function of the potential difference applied between the contacts 21 and 22. Typically, this annular waveguide is connected to a waveguide in which the optical signal to be modulated propagates via an evanescent coupling. In this case, the phase-matching device 300 may be omitted. The waveguide 70 may also form only a limited portion of the annular waveguide.

In another embodiment, the modulator is used to modulate the intensity of the optical signal passing through it. This is because a modification of the density of the charge carriers within the waveguide 70 also modifies the intensity of the optical signal passing through it.

As a variant, the thickness of the end 11 is equal to the thickness of the layer 43 of single-crystal silicon. Indeed, in order to center the point M, where the maximum intensity of the optical field of the optical signal is located, at the center of the layer 20, it is the thickness of the ends 12 and 32 that is important. The thickness of the distal ends 11 and 31 does not have any particular bearing on this point.

The thickness of the layer 20 may be greater than 25 nm or 40 nm.

In a similar manner to what has been described for the proximal end 564, the proximal end 32 of the electrode 130 may be replaced by an end with one region more highly doped than another. In another variant, only the end 32 comprises two regions with different levels of doping and the doping of the end 12 is uniform.

Other embodiments of the regions 566 and 568 with different levels of doping are possible. For example, in one variant, the doping of the proximal end 564 decreases progressively with increasing distance from the layer 20; a doping gradient is thus created. There is not then any abrupt modification of the density per unit volume of dopants when going from the region 566 to the region 568. On the other hand, the mean density per unit volume of dopants in the region 566 remains much higher than the mean density per unit volume of dopants in the region 568.

The doped region of the electrode 120 may extend beyond the proximal end 32 in the direction X or not as far as said end.

As a variant, the width $W_{32}$ of the proximal end 32 of the modulator 580 is smaller than the width $W_{12}$ of the proximal end 12. In this case, the position of the maximum intensity of the optical field inside of the waveguide 70 is controlled by the width $W_{32}$ rather than by the width $W_{12}$.

In another variant, the protrusion 32*d* or 12*d* is omitted. Indeed, the reproducibility of the positioning of the point M is improved even in the absence of this protrusion 32*d* or 12*d*.

Other semiconductor materials may be used to form the electrode 120 or 130. For example, the two electrodes are formed from InP or from polycrystalline or single-crystal silicon.

Other dielectric materials may be used for the material 116 and the layer 20. For example, these could be silicon nitride, aluminum nitride, an electrically-insulating polymer, or $Al_2O_3$. Moreover, in the case of the layer 20, its index of refraction is not necessarily lower than that of silicon.

In another embodiment, the electrode 130 is made of a semiconductor material different from that used to form the strip 33. In this case, the electrode 130 and the strip 33 are not structured in the same sub-layer of III-V material.

Irrespective of the embodiment, it is possible to interchange the N- and P-doped regions.

Variants of the Laser Source:

Other III-V gain materials may be used to form the layer 36. For example, the layer 36 is composed of the following stack going from bottom to top:
  a lower sub-layer of N-doped GaAs,
  sub-layers with quantum dots of AlGaAs, or AlGaAs quantum wells, and
  an upper sub-layer of P-doped GaAs.

The III-V material used to form the sub-layer 30 may be different. For example, it could be N- or P-doped AsGa. It will also be noted that P-doped InP exhibits more optical loss than N-doped InP, and that it is therefore preferable to use N-doped InP in the modulator for the electrode 130.

The waveguide 220 may take a configuration referred to as "strip-mode", in other words where the lateral arms 223G and 223D are omitted, or any other configuration capable of guiding an optical signal.

In another variant, the layer 20 is totally eliminated at the places where it is not indispensable for the operation of the transmitter. For example, it is totally eliminated except between the proximal ends 12 and 32.

Variants of the Method of Fabrication:

The removal of the base substrate 1 may be carried out differently. For example, as a variant, the base substrate 1 is etched away by only implementing the finishing operation without implementing the operation of coarse removal. In another variant, the coarse removal is carried out by means of an operation for coarse etching different from that implemented during the finishing operation.

The outgassing cavities sunk into the layer 20 may be omitted, notably if the layer 20 is thicker. Indeed, if the layer 20 is thicker then the use of outgassing cavities is unnecessary.

As a variant, the electrode 130 and the strip 33 are not formed at the same time in the same sub-layer 30. For example, during the step 528, only the strip 33 is structured. Subsequently, a semiconductor layer is deposited or bonded onto the layer 20 at the location of the future electrode 130. Subsequently, it is etched in order to obtain the electrode 130. In this case, the electrode 130 may be made of a material different from that used for the strip 33 such as crystalline silicon.

The order of the partial and total etching steps may be reversed. For example, a first mask is disposed on the layer 43 in order to bound the periphery of the electrode 120. Then, a localized total etching is performed in order to construct the vertical sides of this electrode 120. Subsequently, a localized partial etching is implemented in order to thin the intermediate part 13 of the electrode 120. During this localized partial etching, a second mask covering at least the proximal end of the electrode 120 is deposited. This second mask leaves the intermediate part 13 exposed.

In another variant, the second localized total etching is replaced by a uniform etching of the whole surface of the layer 3 so as to transform the non-thinned regions into thinned regions and completely eliminate the thinned regions.

The order of the doping and etching steps may be reversed.

The modulator and the laser source may be fabricated independently of each other. For example, the methods of fabrication described here may be easily adapted for fabricating either only a modulator or only a laser source.

Other Variants:

The layer 442 may be made of other materials than silicon oxide. For example, in one advantageous variant, the layer 442 is formed from aluminum nitride (AlN) which improves the dissipation of the heat generated by the laser source 200 toward the substrate 441.

As a variant, a part or the entirety of the bump contacts are formed through the substrate 44 rather than through the material 117. In this case, with respect to what has been shown in the preceding figures, one or more electrical bump contacts come out under the substrate.

As a variant, the waveguide 70, 220 or 320 is curved. In this case, the configuration of the various elements optically coupled to these waveguides is adapted to the radius of curvature of these waveguides.

As a variant, the phase-matching device is omitted or formed differently.

The fact that a proximal end thicker than the intermediate part renders the method of fabrication more robust with respect to the errors in positioning of the electrodes may also be exploited for improving other methods of fabrication of modulators. In particular, this may be implemented in methods other than those where the dielectric layer is directly formed by the buried layer. In particular, the formation of a proximal end thicker than the intermediate part may also be implemented in known methods such as that described in the applications WO 2011037686 or US2015/0055910. In the latter case, the intermediate part is thinned during the structuring of the electrode and before it is encapsulated in the silicon oxide.

Similarly, the higher level of doping of the region 566 of the proximal end directly in contact with the dielectric layer 20 may also be implemented independently of the fact that the dielectric layer is directly formed by the buried layer. For example, as a variant, the layer 20 is firstly removed during the step 522, then a new dielectric layer is deposited in order to replace the layer 20 removed. During the step 522, the layer 20 may also be thinned by more than 10 nm.

The invention claimed is:

1. A method of fabricating a modulator of propagation losses and of index of propagation of a guided optical signal, the method comprising:
    providing a stack comprising, successively, a base substrate, a buried layer of first dielectric material, and a semiconductor layer, thickness at every point of the buried layer being equal to $e_{2ini}$ to within approximately 5 nm, wherein $e_{2ini}$ is a constant equal to an average thickness of the buried layer; then
    etching the semiconductor layer to form a first electrode of the modulator, the first electrode including a proximal end, a distal end, and an intermediate part extending from the proximal end to the distal end to mechanically and electrically connect the proximal end and the distal end, then
    encapsulating the semiconductor layer in a second dielectric material; then
    bonding a substrate onto the encapsulated semiconductor layer; then
    forming a second electrode of the modulator having a proximal end facing the proximal end of the first electrode, the proximal end of the first electrode and the proximal end of the second electrode being separated from each other only by a third dielectric layer, the proximal end of the first electrode, the proximal end of the second electrode, and the third dielectric layer forming a waveguide to guide the optical signal to be modulated;
    wherein following the bonding of the substrate onto the encapsulated semiconductor layer and prior to the forming of the second electrode, the method comprises removing the base substrate to expose one face of the buried layer without modifying the thickness of the buried layer by more than 5 nm; and
    the forming the second electrode is implemented directly on the exposed face of the buried layer such that, once the second electrode has been formed, the buried layer forms the third dielectric layer interposed between the proximal end of the first electrode and the proximal end of the second electrode.

2. The method as claimed in claim 1, wherein:
    the providing the stack comprises provision of a stack in which:
       the base substrate is made of silicon,
       the buried layer is a layer of thermal silicon oxide, obtained by oxidation of a surface of the base substrate at a temperature higher than 700° C.; and
    the forming the second electrode comprises:
       direct bonding of a layer of semiconductor material onto the exposed face of the buried layer; then
       localized etching of the layer of semiconductor material to form the second electrode.

3. The method as claimed in claim 1, wherein:
    the etching of the semiconductor layer comprises a localized etching which thins the intermediate part of the first electrode without thinning the proximal end of the first electrode such that the intermediate part is thinner than the proximal end of the first electrode; and
    the forming the second electrode comprises positioning of the second electrode with respect to the proximal end of the first electrode such that the proximal end of the second electrode extends on either side of the proximal end of the first electrode.

4. The method as claimed in claim 1, wherein the forming the second electrode comprises:
    localized etching which thins an intermediate part of the second electrode, the intermediate part being situated between a distal end and the proximal end of the second electrode such that the intermediate part is thinner than the proximal end of the second electrode; and
    positioning of the second electrode with respect to the proximal end of the first electrode such that the first electrode extends on either side of the proximal end of the second electrode.

5. The method as claimed in claim 1, further comprising localized doping of the semiconductor layer at a location of the proximal end of the first electrode or of the second electrode to dope a first region of the proximal end of the first electrode or of the second electrode directly in contact with the third dielectric layer more highly than a second region further away from the third dielectric layer, thickness of the first region being greater than or equal to 70 nm.

6. The method as claimed in claim 1, wherein the thickness of the buried layer is less than or equal to 25 nm.

7. The method as claimed in claim 1, wherein:
the etching of the semiconductor layer forms a first waveguide at a same time as the first electrode; then
the method further comprises forming, on the exposed face of the buried layer, facing the first waveguide, a second waveguide made of III-V material to amplify the optical signal, the second waveguide being coupled to the first waveguide through the buried layer.

8. The method as claimed in claim 1, wherein the removing the base substrate comprises an operation of selective etching of at least a residual thin layer of the base substrate directly in contact with the buried layer, using a chemical agent which etches the base substrate at least 500 times faster than the buried layer.

9. The modulator of propagation losses and of index of propagation of the optical signal, fabricated by the method of fabrication in accordance with claim 1, the modulator comprising:
a substrate extending in a plane;
the semiconductor layer encapsulated in the second dielectric material, the encapsulated semiconductor layer comprising a lower face directly facing the substrate and an upper face facing a side opposite to the substrate, the encapsulated semiconductor layer further comprising at least the first electrode of the modulator formed in the semiconductor layer, the first electrode extending, in a transverse direction parallel to the plane of the substrate, from the proximal end of the first electrode to the distal end of the first electrode via the intermediate part of the first electrode and the second dielectric material continuing, in the transverse direction, until the second dielectric material directly touches the proximal end of the first electrode, the proximal and distal ends and the intermediate part of the first electrode being flush with the upper face of the encapsulated semiconductor layer;
the second electrode made of semiconductor material having a doping of opposite sign to a doping of the first electrode, the second electrode extending from the proximal end of the second electrode to a distal end of the second electrode via an intermediate part of the second electrode, the proximal end of the second electrode being situated facing the proximal end of the first electrode and the distal end of the second electrode being situated on an opposite side to the distal end of the first electrode with respect to a plane perpendicular to the transverse direction and going through the proximal ends of the first electrode and the second electrode;
the buried layer of the first dielectric material interposed between the proximal ends of the first electrode and the second electrode, superposition of the proximal ends of the first electrode and the second electrode and of the third dielectric layer forming the waveguide configured to guide the optical signal to be modulated;
bump contacts in direct mechanical and electrical contact with, respectively, the distal ends of the first electrode and the second electrode for electrically connecting the first electrode and the second electrode to different electrical potentials to modify a density of charge carriers in the waveguide;
wherein the proximal end of the first electrode is thicker than the intermediate part of the first electrode.

10. The modulator as claimed in claim 9, wherein the proximal end of the first electrode or of the second electrode comprises a first region directly in contact with the third dielectric layer, the first region is more highly doped than a second region of the proximal end of the first electrode or the second electrode further away from the third dielectric layer.

11. The modulator as claimed in claim 10, wherein thickness of the first region is greater than or equal to 70 nm.

12. The modulator as claimed in claim 9, wherein the buried layer of the first dielectric material is a layer of thermal oxide obtained by oxidation of the base substrate at over 700° C.

13. The modulator as claimed in claim 9, wherein, at every point of the buried layer, thickness of the buried layer is equal to $e_{2ini}$ to within approximately 10 nm, wherein $e_{2ini}$ is a constant equal to an average thickness of the buried layer.

14. The modulator as claimed in claim 9, wherein the proximal end of the second electrode extends, over a distance of at least 5 nm, in the transverse direction on either side of the proximal end of the first electrode.

* * * * *

UNITED STATES PATENT AND TRADEMARK OFFICE
CERTIFICATE OF CORRECTION

PATENT NO. : 10,705,354 B2
APPLICATION NO. : 16/319902
DATED : July 7, 2020
INVENTOR(S) : Sylvie Menezo et al.

Page 1 of 1

It is certified that error appears in the above-identified patent and that said Letters Patent is hereby corrected as shown below:

In the Claims

Column 17, Line 65, Claim 1, delete "end," and insert --end;--, therefor.

Signed and Sealed this
Twenty-second Day of December, 2020

Andrei Iancu
*Director of the United States Patent and Trademark Office*